United States Patent
Lee et al.

(10) Patent No.: US 10,104,626 B2
(45) Date of Patent: Oct. 16, 2018

(54) METHOD OF PROCESSING MULTIPLE COMPONENT CARRIERS AND DEVICE THEREOF

(71) Applicant: SAMSUNG ELECTRONICS CO., LTD., Suwon-si, Gyeonggi-do (KR)

(72) Inventors: Jung Ho Lee, Yongin-si (KR); Yun Sung Mo, Seongnam-si (KR); Ki Joon Hong, Seoul (KR); Young Seok Jung, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/365,407

(22) Filed: Nov. 30, 2016

(65) Prior Publication Data

US 2017/0164311 A1   Jun. 8, 2017

(30) Foreign Application Priority Data

Dec. 3, 2015   (KR) ........................ 10-2015-0171658

(51) Int. Cl.
*H04W 56/00* (2009.01)
*H04W 72/04* (2009.01)
(Continued)

(52) U.S. Cl.
CPC ......... *H04W 56/0005* (2013.01); *H04L 5/005* (2013.01); *H04L 27/265* (2013.01);
(Continued)

(58) Field of Classification Search
CPC ... H04L 1/1835; H04L 1/1874; H04L 45/245; H04L 47/14; H04L 5/0007; H04L 5/001; H04L 27/2647; H04L 5/0042; H04L 5/0091; H04L 27/2634; H04L 27/265; H04L 47/6245; H04L 5/005; H04L 5/0051; H04L 5/0053; H04L 5/0073; H04L 27/2633; H04L 27/2657; H04L 27/2671; H04L 5/0005; H04L 5/0041; H04L 5/14; H04W 72/042; H04W 72/0453; H04W 16/14; H04W 84/12; H04W 56/0005; H04W 88/02; H04W 56/001; H04W 56/0045; H04W 72/0413; H04B 7/0413; H04B 1/0075; G01S 5/021
See application file for complete search history.

(56) References Cited

U.S. PATENT DOCUMENTS

| | | |
|---|---|---|
| 8,098,567 B2 | 1/2012 | Brehler |
| 8,428,001 B2 | 4/2013 | Vrcelj et al. |
| 8,634,313 B2 | 1/2014 | Tenny et al. |
| 8,675,570 B2 | 3/2014 | Cai |
| 8,902,802 B2 | 12/2014 | Park et al. |

(Continued)

FOREIGN PATENT DOCUMENTS

KR   10-2015-0037888   4/2015

*Primary Examiner* — Olumide T Ajibade Akonai
(74) *Attorney, Agent, or Firm* — F. Chau & Associates, LLC

(57) ABSTRACT

A method of processing a plurality of component carriers (CCs) included in a signal received by a user equipment includes receiving a first CC and a second CC, in which the first and second CCs have different reception timings, front-processing the first and second CCs asynchronously, controlling a timing between the first and second CCs using an alignment buffer memory, and processing the timing-controlled first and second CCs synchronously. The plurality of CCs includes at least the first and second CCs.

17 Claims, 13 Drawing Sheets

(51) Int. Cl.
*H04L 12/863* (2013.01)
*H04L 5/00* (2006.01)
*H04L 27/26* (2006.01)
*H04W 88/02* (2009.01)

(52) U.S. Cl.
CPC ..... *H04L 47/6245* (2013.01); *H04W 72/0453* (2013.01); *H04W 88/02* (2013.01)

(56) References Cited

U.S. PATENT DOCUMENTS

| | | |
|---|---|---|
| 8,948,028 B2 | 2/2015 | Zhang et al. |
| 9,042,248 B2 | 5/2015 | Futaki |
| 9,084,195 B2 * | 7/2015 | Sebire ............... H04W 56/0045 |
| 2010/0318871 A1 * | 12/2010 | Lee ....................... H04L 1/0038 714/749 |
| 2012/0008600 A1 * | 1/2012 | Marinier ................ H04L 5/001 370/336 |
| 2012/0028592 A1 * | 2/2012 | Pick ..................... H04L 1/1812 455/130 |
| 2012/0120821 A1 * | 5/2012 | Kazmi ............. H04W 56/0005 370/252 |
| 2013/0121316 A1 | 5/2013 | Skov et al. |
| 2014/0192857 A1 * | 7/2014 | Perets .................... H04L 69/04 375/240 |
| 2014/0256277 A1 | 9/2014 | Ki et al. |
| 2014/0378157 A1 * | 12/2014 | Wei ....................... H04W 16/14 455/454 |
| 2015/0173056 A1 | 6/2015 | Yerramalli et al. |
| 2015/0208372 A1 | 7/2015 | You et al. |
| 2016/0088635 A1 * | 3/2016 | Davydov ............. H04L 1/1812 370/329 |

* cited by examiner

METHOD OF PROCESSING MULTIPLE COMPONENT CARRIERS AND DEVICE THEREOF

CROSS-REFERENCE TO RELATED APPLICATIONS

This application claims priority under 35 U.S.C. § 119 to Korean Patent Application No. 10-2015-0171658 filed on Dec. 3, 2015, the disclosure of which is incorporated by reference herein in its entirety.

TECHNICAL FIELD

Exemplary embodiments of the inventive concept relate to a wireless communication apparatus, and more particularly, to a method and apparatus for receiving and processing multiple component carrier signals, and a user equipment (UE) therefor.

DISCUSSION OF THE RELATED ART

In a wireless communication system, a user equipment (UE) may receive data and/or various control information from a base station (BS) via a downlink (DL), and transmit data and/or various information via an uplink (UL).

In a wireless communication system, users' desire for a large amount of data and high data transmission speed has increased. Thus, demands for a wide frequency band have also increased.

In a wireless communication system based on 3rd Generation Partnership Project (3GPP) Long-Term Evolution (LTE) or 3GPP LTE-Advanced (LTE-A), carrier aggregation or bandwidth aggregation has been utilized to obtain a wider frequency band.

SUMMARY

According to an exemplary embodiment of the inventive concept, a method of processing a plurality of component carriers (CCs) included in a signal received by a user equipment includes receiving a first CC and a second CC, in which the first and second CCs have different reception timings, front-processing the first and second CCs asynchronously, controlling a timing between the first and second CCs using an alignment buffer memory, and processing the timing-controlled first and second CCs synchronously. The plurality of CCs includes at least the first and second CCs.

According to an exemplary embodiment of the inventive concept, a signal processing apparatus for processing a plurality of component carriers (CCs) includes a front-processing circuit, an alignment buffer, and an alignment controller. The front-processing circuit is configured to receive a first CC and a second CC, and front-process the second CC asynchronously with the first CC. The second CC is later than the first CC in reception timing. The alignment buffer memory is configured to store front-processed symbols of the first CC. The alignment controller is configured to output the front-processed symbols of the first CC from the alignment buffer memory such that the front-processed symbols of the first CC and front-processed symbols of the second CC are aligned with respect to the second CC. The plurality of CCs includes at least the first and second CCs.

According to an exemplary embodiment of the inventive concept, a user equipment includes a signal processing device and an application processor. The signal processing device is configured to generate decoded data by processing a plurality of component carriers (CCs). The plurality of CCs includes at least a first CC and a second CC. The application processor is configured to process the decoded data and provide a user with the processed data. The signal processing device includes a front-processing circuit, an alignment controller, and a synchronous processing circuit. The front-processing circuit is configured to receive the first CC and the second CC, and front-process the first and second CCs asynchronously. The first and second CCs have different reception timings. The alignment controller is configured to control a timing between the first and second CCs using an alignment buffer memory. The synchronous processing circuit is configured to process the timing-controlled first and second CCs synchronously.

According to an exemplary embodiment of the inventive concept, a signal processing apparatus for processing a plurality of component carriers (CCs) includes a front-processing circuit, an alignment buffer, and an alignment controller. The front-processing circuit is configured to receive a first CC and a second CC. Each of the first CC and the second CC comprise a plurality of symbols. The front-processing circuit is configured to output at least a first two symbols of the first CC, and subsequently alternately output remaining symbols of the first CC and the second CC, to an alignment controller. The second CC is later than the first CC in reception timing. The alignment buffer memory is configured to store the plurality of symbols of the first CC. The alignment controller is configured to set the second CC as a reference CC, and output the plurality of symbols of the first CC from the alignment buffer memory such that the plurality of symbols of the first CC and the plurality of symbols of the second CC are aligned with respect to the second CC. The plurality of CCs includes at least the first and second CCs.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
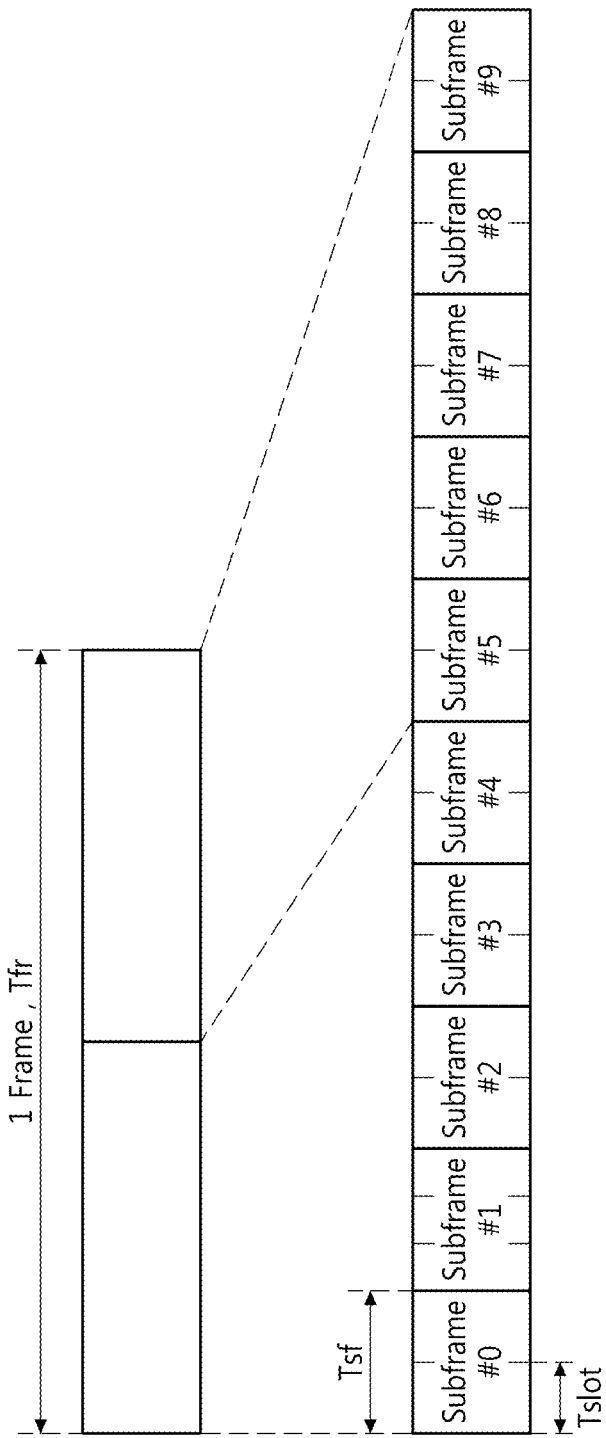
FIG. 1 is a diagram illustrating an example of a radio frame structure employed in a wireless communication system according to an exemplary embodiment of the inventive concept.

Exemplary embodiments of the inventive concept will be described more fully hereinafter with reference to the accompanying drawings. In the drawings, the size and relative sizes of layers and regions may be exaggerated for clarity. Like reference numerals may refer to like elements throughout the accompanying drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

As used herein, the singular forms "a", "an" and "the" are intended to include the plural forms as well, unless the context clearly indicates otherwise.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concept. Further, the blocks, units and/or modules of the embodiments may be physically combined into more complex blocks, units and/or modules without departing from the scope of the inventive concept.

For convenience of explanation, various exemplary embodiments of the inventive concept will be described with respect to 3rd Generation Partnership Project (3GPP) Long-Term Evolution (LTE) or 3GPP LTE-Advanced (LTE-A) standards. However, it is to be understood that the inventive concept is not limited to LTE/LTE-A systems. For example, exemplary embodiments of the inventive concept may be applied to other wireless communication systems.

For example, exemplary embodiments of the inventive concept are applicable to a is wireless communication system according to 3GPP release 12. However, exemplary embodiments of the inventive concept are not limited thereto.

Hereinafter, a carrier configured according to the 3GPP wireless communication standard will be referred to as a component carrier (CC) or a cell.

in the present disclosure, user equipment (UE) may be any of various devices that are fixed or have mobility, and that may communicate with a base station (BS) to transmit/receive user data and/or various control information to/from the BS. The UE may be referred to as, for example, terminal equipment, a mobile station (MS), a mobile terminal (MT), a user terminal (UT), a subscriber station (SS), a wireless device, a personal digital assistant (PDA), a wireless modem, a handheld device, a smartphone, etc.

According to exemplary embodiments, the base station refers to a fixed station communicating with a UE and/or another base station. The base station may communicate with the UE and/or another base station to exchange various data and control information with the UE and/or the other base station. The base station may be referred to as, for example, an Advanced Base Station (ABS), a node-B (NB), an evolved-node B (eNB), a base transceiver system (BTS), an access point, a processing server (PS), etc.

The 3GPP LTE/LTE-A standard defines downlink physical channels corresponding to resource elements transmitting information based on an upper layer, and downlink physical signals corresponding to resource elements which are used by a physical layer but do not transmit information based on the upper layer. The downlink physical channel may be, for example, a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), etc. A reference signal (RS) and a synchronization signal have been defined as the downlink physical signals. A reference signal, which is also referred to as a pilot, may be a signal having a predetermined specific waveform known to both a base station and a UE.

In an exemplary embodiment of the inventive concept, the PCFICH, the PDCCH, the PBCH, and the PDSCH are time and/or frequency resources transmitting a downlink control signal and/or downlink data.

In an exemplary embodiment of the inventive concept, a reference symbol is an orthogonal frequency division multiplexing (OFDM) symbol to which an RS is allocated.

Figure 2:
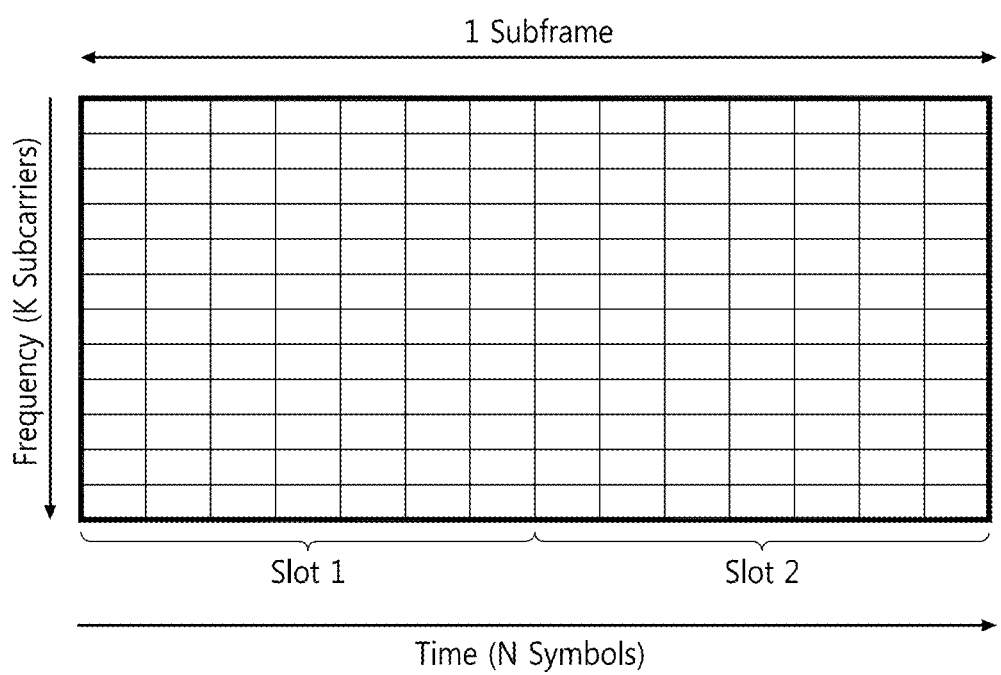
FIG. 2 is a diagram illustrating an example of a structure of a subframe of FIG. 1 according to an exemplary embodiment of the inventive concept.

FIG. 1 is a diagram illustrating an example of a radio frame structure employed in a wireless communication system according to an exemplary embodiment of the inventive concept FIG. 2 is a diagram illustrating an example of a structure of a subframe of FIG. 1 according to an exemplary embodiment of the inventive concept.

Referring to FIGS. 1 and 2, in an exemplary embodiment, a radio frame used in a 3GPP LTE/LTE-A system has a length of 10 ms (Tfr) and includes ten equal-sized subframes. Each of the subframes has a length of 1 ms (Tsf) and includes two slots. In one radio frame, ten subframes may be sequentially numbered from 0 to 9. In one radio frame, twenty slots may be sequentially numbered from 0 to 19. Each of the slots has a length of 0.5 ms (Tslot). The time required to send one subframe is defined as a transmission time interval (TTI). Time resources may be identified with radio frame numbers (which may be also referred to herein as radio frame indexes), subframe numbers (which may be also referred to herein as subframe indexes), slot numbers (which may also be referred to herein as slot indexes), etc.

Each of the subframes may include a plurality of symbols (N symbols). The symbols may be, for example, OFDM symbols in a time domain. One subframe may include, for example, 14 (N=14) OFDM symbols. However, the number of symbols included in one subframe is not limited thereto. In addition, it is to be understood that the respective lengths of the radio frame, subframes, and slots discussed above are exemplary, and exemplary embodiments of the inventive concept are not limited thereto.

Each of the subframes may include a plurality of subcarriers (K subcarriers) in a frequency domain. Thus, each of the plurality of symbols may also include a plurality of subcarriers.

In an exemplary embodiment, one symbol may use a plurality of subcarriers (K subcarriers) having different frequencies according to bandwidth. Here, K denotes an integer which is greater than or equal to 2. K may vary according to bandwidth.

Figure 3:
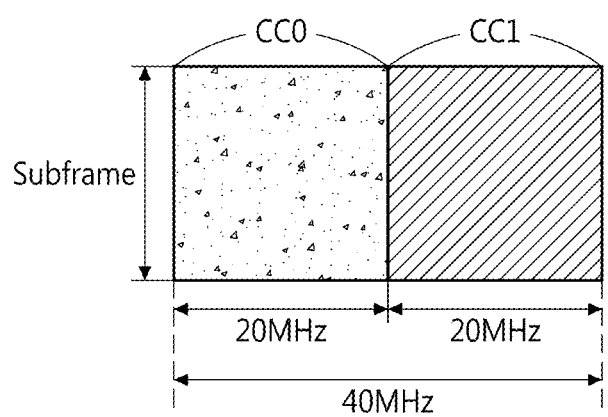
FIG. 3 is a diagram illustrating multi-carrier communication.

FIG. 3 is a diagram illustrating multi-carrier communication. In general, in a wireless communication system, data is transmitted or received through one downlink (DL) band and one uplink (UL) band corresponding to the downlink (DL), or a radio frame is divided into an uplink time unit and a downlink time unit in a time domain and data is transmitted or received through the uplink/downlink time unit.

In a wireless communication system according to an exemplary embodiment of the inventive concept, one downlink (DL) band and one uplink (UL) band corresponding to the downlink (DL) band may be used. Alternatively, in a wireless communication system according to an exemplary embodiment of the inventive concept, a plurality of downlink (DL) bands (e.g., two or more downlink (DL) bands) and a plurality of uplink (UL) bands (e.g., two or more uplink (UL) bands) may be used.

As described above, the use of a larger uplink (UL)/downlink (DL) bandwidth by collecting uplink (UL) and/or downlink (DL) frequency blocks so as to use a wider frequency band is referred to as carrier aggregation or bandwidth aggregation. Each of the carriers collected by carrier aggregation is referred to as a component carrier (CC).

FIG. 3 illustrates an example in which a 40 MHz bandwidth is used by collecting two 20 MHz CCs CC0 and CC1. However, exemplary embodiments of the inventive concept are not limited thereto. For example, according to exemplary embodiments, a bandwidth of each of the CCs CC0 and CC1 or the number of CCs to be used can be varied. Further, in exemplary embodiments, the CCs CC0 and CC1 may be adjacent to each other or may not be adjacent to each other in a frequency domain, the CCs CC0 and CC1 may be synchronized with each other or may not be synchronized with each other in a time domain, and the CCs CC0 and CC1 may be transmitted from the same base station or different base stations.

A UE may receive two or more CCs from one or more base stations and process the two or more CCs. That is, the UE may receive and process two or more synchronous CCs or two or more asynchronous CCs.

Figure 4:
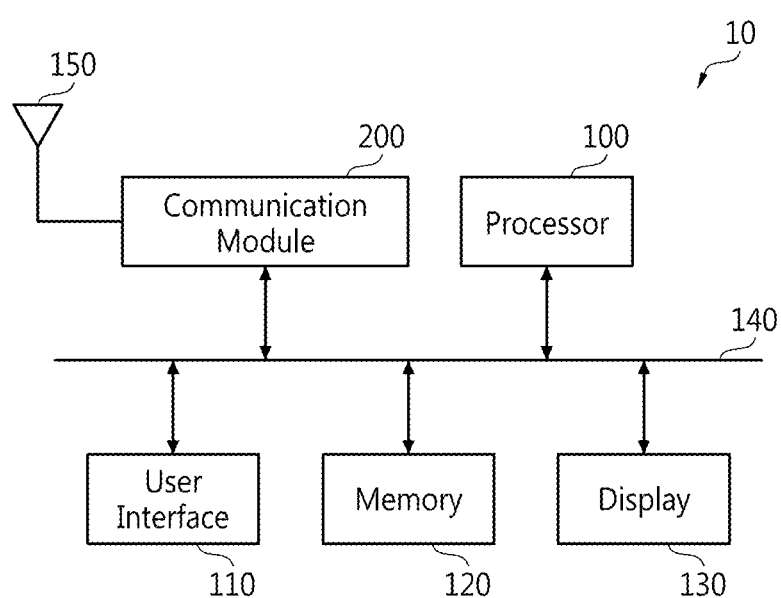
FIG. 4 is a schematic block diagram of an electronic device according to an exemplary embodiment of the inventive concept.

FIG. 4 is a schematic block diagram of an electronic device 10 according to an exemplary embodiment of the inventive concept.

The electronic device 10 may correspond to a UE as described above. The electronic device 10 may include, for example, a processor 100, a communication module 200, a memory 120, a bus 140, and at least one antenna 150. The electronic device 10 may further include a user interface 110 and a display device 130. The electronic device 10 may further include additional components.

The processor 100 controls overall operations of the electronic device 10.

The communication module 200 may receive a downlink radio signal from a base station via the at least one antenna 150, front-process the downlink radio signal, and demodulate and decode the front-processed signal to restore data and/or a control signal included in the downlink radio signal.

The communication module 200 may perform a multi-input multi-output (MIMO) function of transmitting/receiving data via a plurality of antennas.

The downlink radio signal may include two or more CCs as illustrated in FIG. 3.

The communication module 200 may encode and modulate data and/or a control signal to be transmitted outside of the electronic device 10, convert the modulated data and/or signal into an uplink radio signal, and transmit the uplink radio signal to the base station via the at least one antenna 150. Similar to the downlink radio signal, the uplink radio signal may include two or more CCs as illustrated in FIG. 3.

The communication module 200 may be hardware, firmware, hardware executing software, or any combination thereof.

When the communication module 200 is hardware, such hardware may include, for example, one or more central processing units (CPUs), digital signal processors (DSPs), application-specific-integrated-circuits (ASICs), field programmable gate arrays (FPGAs) computers, etc., which are configured as special purpose machines to perform the functions of the communication module 200. CPUs, DSPs, ASICs and FPGAs may generally be referred to herein as processors and/or microprocessors.

When the communication module 200 includes a processor executing software, the processor is configured as a special purpose machine to execute the software to perform the functions of the communication module 200. In such an exemplary embodiment, the communication module 200 may include, for example, one or more central processing units (CPUs), digital signal processors (DSPs), application-specific-integrated-circuits (ASICs), field programmable gate arrays (FPGAs) computers, etc.

The memory 120 stores various data and information in the electronic device 10.

The memory 120 may store a program for processing and controlling the processor 100, and may temporarily store information which is input via the user interface 110 or is to be output via the user interface 110. Also, the memory 120 may store data received by or to be transmitted by the communication module 200, and data to be displayed on the display device 130.

The processor 100 may control the elements of the electronic device 10 such as the communication module 200 and the memory 120 by being operationally connected to the elements, for example, through the bus 140.

The processor 100 may be embodied as a multi-core processor. The multi-core processor may be one computing component having two or more independent and substantial processors (which are referred to herein as cores). Each of the processors may read and execute program instructions.

In an exemplary embodiment, in addition to including a processor configured to control overall operations of the electronic device 10, the processor 100 may also include a processor dedicated to controlling the communication module 200.

The processor 100 may also be referred to herein as a controller, a microcontroller, a microprocessor, a microcomputer, an application processor, etc. The processor 100 may be realized by hardware, firmware, software, or a combination thereof.

The user interface 110 is a device configured to interface a user of the electronic device 10 with the electronic device 10. For example, the user interface 110 may include various types of input devices such as a button, a keypad, a dial, a touch screen, an audio input interface, an image/video input interface, a sensor data input interface, etc.

The display device 130 may display an image/video signal to a user under control of the processor 100.

The elements 100, 110, 120, 130, and 200 may exchange instructions and/or data with one another via the bus 140.

Figure 5:
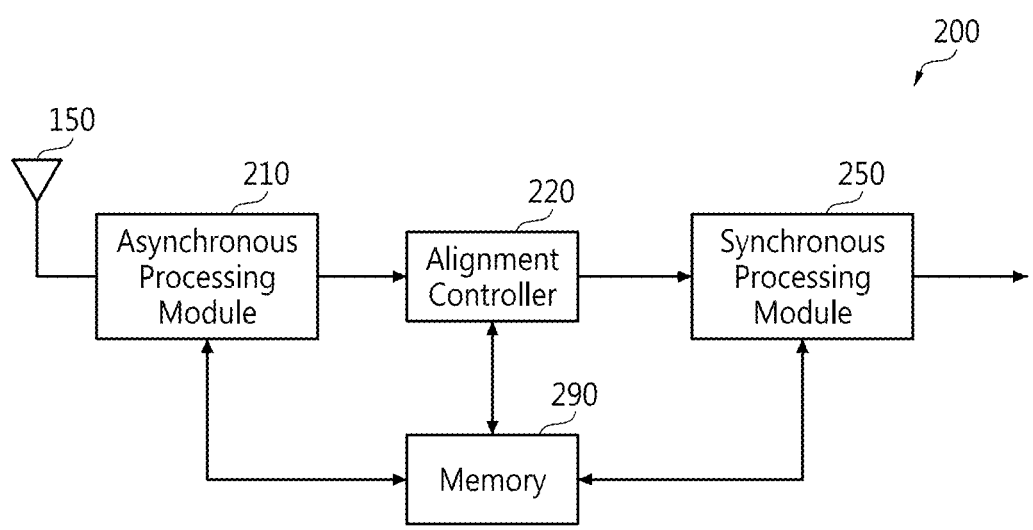
FIG. 5 is a block diagram of a communication module of FIG. 4 according to an exemplary embodiment of the inventive concept.

FIG. 5 is a block diagram of the communication module 200 of FIG. 4 according to an exemplary embodiment of the inventive concept.

Referring to FIG. 5, the communication module 200 may include, for example, an asynchronous processing module 210 (also referred to as a front-processing module 210 or a front-processing circuit 210), an alignment controller 220 (also referred to as an alignment controller circuit 220), and a synchronous processing module 250 (also referred to as a synchronous processing circuit 250). The communication module 200 may further include an internal memory 290.

The asynchronous processing module 210 receives and front-processes a downlink radio signal from a base station in real time according to a predetermined sequence. The asynchronous processing module 210 may receive and front-process the downlink radio signal from the base station in real time according to the predetermined sequence as soon as the downlink radio signal is input from the base station via the at least one antenna 150. As described above, the downlink radio signal may include two or more CCs.

For example, when the downlink radio signal includes a first CC CC0 and a second CC CC1 which is later than the first CC CC0 in reception timing, the asynchronous processing module 210 processes the second CC CC1 asynchronously with the first CC CC0.

Here, the processing of the second CC CC1 asynchronously with the first CC CC0 may be understood as meaning that artificial timing control (e.g., artificially delaying or advancing of timing of one CC) is not performed to adjust timing between two or more CCs.

The alignment controller 220 receives two or more CCs front-processed by the asynchronous processing module 210, controls timing between the front-processed two or more CCs, and outputs the timing-controlled two or more CCs.

For example, the alignment controller 220 outputs two or more CCs aligned with each other by controlling timing of remaining CCs with respect to one of the two or more CCs (e.g., the latest CC).

The synchronous processing module 250 receives and processes the aligned two or more CCs.

Here, 'timing control' or 'aligning' means artificially controlling timing of one or more CCs, and should not be understood as physically controlling the timing of the one or more CCs to be the same. For example, 'aligning' may be understood as controlling timing between two CCs, the reception timing difference of which is greater than one symbol (e.g., one OFDM symbol period) to be one symbol or less.

The internal memory 290 may be included in the communication module 200 separately from the memory 120, and may temporarily store data generated by the communication module 200.

Each of the asynchronous processing module 210, the alignment controller 220, and the synchronous processing module 250 may be implemented by hardware, firmware, hardware executing software, or any combination thereof.

When each of the asynchronous processing module 210, the alignment controller 220, and the synchronous processing module 250 is implemented by hardware, application specific integrated circuits (ASICs), digital signal processors (DSPs), digital signal processing devices (DSPDs), programmable logic devices (PLDs), or field programmable gate arrays (FPGAs) configured to accomplish an exemplary embodiment of the inventive concept may be employed. When each of the asynchronous processing module 210, the alignment controller 220, and the synchronous processing module 250 is realized by firmware or software, the firmware or the software may be configured to include a procedure, a function, or an algorithm for performing a function or operations according to an exemplary embodiment of the inventive concept. The firmware or the software configured to accomplish an exemplary embodiment of the inventive concept may be stored in a memory embedded in the processor 100 of FIG. 4, or a processor dedicated to the communication module 200, the memory 120 of FIG. 4, or the internal memory 290 of FIG. 5.

Figure 6:
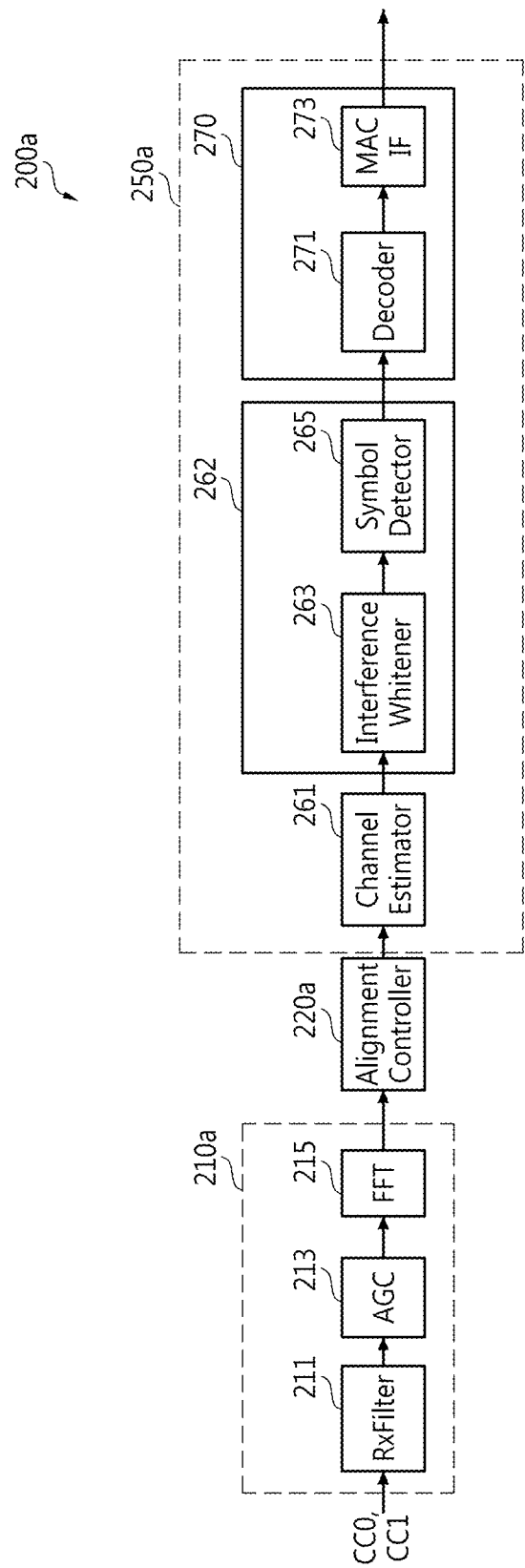
FIG. 6 is a block diagram of a communication module of FIG. 5 according to an exemplary embodiment of the inventive concept.
Figure 7:
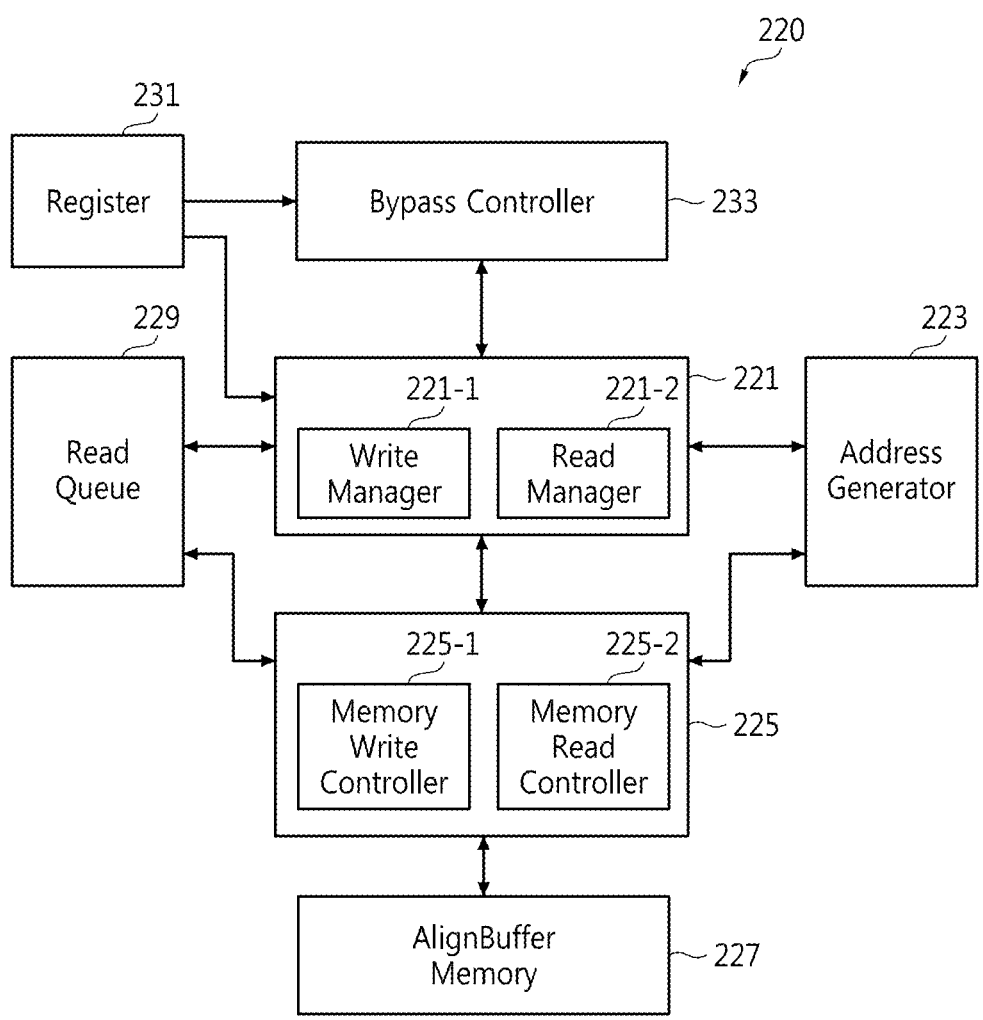
FIG. 7 is a block diagram of an alignment controller of FIG. 5 according to an exemplary embodiment of the inventive concept.

FIG. 6 is a block diagram of an exemplary embodiment 200a of a communication module 200 shown in FIG. 5. FIG. 7 is a block diagram of the alignment controller 200 of FIG. 5 according to an exemplary embodiment of the inventive concept.

Referring to FIGS. 5 to 7, an asynchronous processing module 210a may include a reception (Rx) filter 211, an automatic gain controller (AGC) 213, and a Fast Fourier Transform (FFT) unit 215.

The Rx filter 211 may obtain only a CC signal corresponding to a desired bandwidth by filtering an input signal. Here, the input signal may be a signal based on a radio signal received via the at least one antenna 150 of FIG. 5. For example, the input signal may be a base-band signal obtained by, for example, down-converting the radio signal received via the at least one antenna 150 to a baseband signal, and performing analog-to-digital conversion on the baseband signal.

In an exemplary embodiment, a radio-frequency (RF) module configured to process a radio signal received via the at least one antenna 150 may be included in the communication module 200 or 200a, or between the at least one antenna 150 and the communication module 200 or 200a. The RF module may process the radio signal received via the at least one antenna 150 to generate a base-band signal.

The AGC 213 automatically adjusts a gain of a filtered CC.

The FFT unit 215 obtains a frequency-domain signal by performing FFT on a symbol (e.g., an OFDM symbol) in a CC signal.

For example, the FFT unit 215 may generate FFT symbols of a first CC CC0 in a frequency domain by performing FFT on the first CC CC0, and generate FFT symbols of a second CC CC1 in the frequency domain by performing FFT on the second CC CC1.

In an exemplary embodiment, the FFT unit 215 may perform FFT on the first CC CC0 and the second CC CC1 time-divisionally or in parallel.

The FFT symbols of the frequency domain output from the FFT unit 215 may be directly input to the alignment controller 220a or temporarily stored in the internal memory 290 of FIG. 5.

In an exemplary embodiment, the asynchronous processing module 210a may further perform a function of a down-converter which down-converts a high-frequency CC signal into a baseband signal, and a function of an analog-to-digital (A/D) converter which converts an analog signal into a digital signal, before the high-frequency CC signal is filtered by the Rx filter 211 or a gain thereof is controlled by the AGC 213.

When a base station adds a cyclic prefix (CP) to a symbol (e.g., an OFDM symbol) and transmits the symbol to a UE, the asynchronous processing module 210a may remove the CP from the symbol and perform FFT on the symbol.

The alignment controller 220a may receive symbols front-processed asynchronously by the asynchronous processing module 210a, align the symbols with respect to symbols of a reference CC, and provide the symbols to the synchronous processing module 250a.

According to an exemplary embodiment, as shown in FIG. 7, the alignment controller 220a may include a manager 221, an address generator 223, a memory controller 225, an alignment buffer memory 227, a symbol manager (read queue) 229, a register 231, and a bypass controller 233.

The manager 221 controls overall operations of the alignment controller 220a.

The manager 221 may select, as a reference CC, a CC of latest timing from among a plurality of CCs, and store symbols of the other CCs in the alignment buffer memory 227 on the basis of the reference CC.

The manager 221 may control the symbols of the CCs stored in the alignment buffer memory 227 to be output according to the reference CC.

A write manager 221-1 controls FFT symbols received from the FFT unit 215 to be divided in units of CCs and stored in the alignment buffer memory 227. For example, when a CC CC1 is a reference CC and a CC CC0 is faster than the CC CC1 in reception timing, the write manager 221-1 may control a symbol of the CC CC0 among the FFT symbols received from the FFT unit 215 to be stored in the alignment buffer memory 227.

The internal memory 290 of FIG. 5 or an additional memory may be used as the alignment buffer memory 227.

In an exemplary embodiment, the write manager 221-1 may control a symbol of a CC CC0 and a symbol of a CC CC1 among FFT symbol data received from the FFT unit 215 to be respectively stored in a first region and a second region of the alignment buffer memory 227.

The first and second regions of the alignment buffer memory 227 may be logically or physically divided regions.

In an exemplary embodiment, the alignment buffer memory 227 may be a first-in-first-out (FIFO) buffer or a circular buffer. However, the alignment buffer memory 227 is not limited thereto.

For example, the write manager 221-1 may control the symbol of the CC CC0 and the symbol of the CC CC1 among the FFT symbol data received from the FFT unit 215 to be respectively stored in a first buffer and a second buffer of the alignment buffer memory 227.

When an FFT symbol of the CC CC0 is stored in the alignment buffer memory 227, a read manager 221-2 may manage the FFT symbol of the CC CC0 to be read from the alignment buffer memory 227 according to an FFT symbol of the CC CC1, which is a reference CC.

For example, the read manager 221-2 may read the FFT symbol of the CC CC0 from the alignment buffer memory 227 and provide it to the synchronous processing module 250a according to timing when the FFT symbol of the CC CC1, which is the reference CC, is provided to the synchronous processing module 250a.

The symbol manager (read queue) 229 may manage outputting of the symbols stored in the alignment buffer memory 227.

For example, the symbol manager (read queue) 229 may manage, in the form of a bitmap, whether the symbols stored in the alignment buffer memory 227 have been read, in units of the symbols.

For example, the symbol manager (read queue) 229 may include a 14-bit bitmap in which one bit is mapped to each symbol of the CC CC0, and may set all initial values of the bitmap to a first logic level (e.g., 0). The symbol manager (read queue) 229 may convert bits of the bitmap corresponding to symbols read from the bitmap to a second logic level (e.g., 1) whenever the symbols stored in the alignment buffer memory 227 are sequentially read.

The address generator 223 generates an address of the alignment buffer memory 227 at which the FFT symbols of the CC CC0 and/or the FFT symbols of the CC CC1 are to be stored. For example, the address generator 223 may generate an address of the first region of the alignment buffer memory 227 in which the FFT symbols of the CC CC0 are to be stored, and an address of the second region of the alignment buffer memory 227 in which the FFT symbols of the CC CC1 are to be stored.

The memory controller 225 stores the FFT symbols in the alignment buffer memory 227, or reads the FFT symbols from the alignment buffer memory 227, under control of the manager 221.

A memory write controller 225-1 may store the FFT symbols of the CC CC0 and/or the FFT symbols of the CC CC1 at the address of the alignment buffer memory 227 generated by the address generator 223, under control of the write manager 221-1.

A memory read controller 225-2 may read the FFT symbols of the CC CC0 and/or the FFT symbols of the CC CC1 from the alignment buffer memory 227 according to timing when the CCs CC0 and CC1 are aligned, under control of the read manager 221-2.

The register 231 stores control parameters used to operate the alignment controller 220a.

For example, in an exemplary embodiment, a processor dedicated to the communication module 200a of FIG. 6 or the processor 100 of FIG. 4 may set the control parameters in the register 231 via the bus 140 of FIG. 4.

The control parameters may include, for example, mode information, information regarding a reference CC, and information regarding a timing difference between CCs. However, the control parameters are not limited thereto.

The mode information may be, for example, information indicating a synchronous mode or an asynchronous mode.

According to exemplary embodiments, the synchronous mode may be an operating mode of the communication module 200a when the reception timings of two or more CCs are the same. The asynchronous mode may be an operating mode of the communication module 200a when the reception timings of two or more CCs are different from one another.

In the asynchronous mode, the information regarding the reference CC may be information representing a reference CC among a plurality of CCs.

A timing difference between CCs is information representing a reception timing difference between the reference CC and another CC. The timing difference may be expressed with the number of symbols. However, expression of the timing difference is not limited thereto.

In the synchronous mode, the bypass controller 233 controls an FFT symbol of each CC received from the FFT unit 215 to be bypassed, rather than being stored in the alignment buffer memory 227.

For example, in an exemplary embodiment, in the synchronous mode, FFT symbols of CCs received from the FFT unit 215 may be bypassed rather than being stored in the alignment buffer memory 227 under control of the bypass controller 233. However, exemplary embodiments of the inventive concept are not limited thereto.

For example, in the synchronous mode, the FFT symbols of the CCs received from the FFT unit 215 may be stored in the alignment buffer memory 227 in units of the CCs, and read from the alignment buffer memory 227 and transmitted to the synchronous processing module 250a according to read timing.

The synchronous processing module 250a receives and processes symbols of two or more CCs aligned by the alignment controller 220a. For example, the synchronous processing module 250a may alternately receive and process (e.g., time-divisionally process) the symbols of the aligned two or more CCs. Alternatively, the synchronous processing module 250a may receive and process the symbols of the aligned two or more CCs in parallel.

The synchronous processing module 250a may include, for example, a channel estimator 261, a demodulator 262, and a symbol processor 270.

The channel estimator 261 may estimate a channel of a CC using reference symbols among reference symbols of the CC. As will be described below with reference to FIG. 9, in an example, one subframe may include fourteen symbols 0 to D. Some of the fourteen symbols may be reference symbols 0, 1, 4, 7, 8, and B, and the other symbols may be data symbols.

The channel estimator 261 may estimate a channel of each CC using the reference symbols 0, 1, 4, 7, 8, and B among the fourteen symbols 0 to D in a subframe of the CC.

The demodulator 262 demodulates the symbols except for the reference symbols. Demodulation is performed based on a result of estimating the CC by the channel estimator 261. The demodulator 262 may include, for example, an interference whitener 263 and a symbol detector 265.

The interference whitener 263 (also referred to as a whitening filter 263) may whiten interference noise caused by another channel or another CC to decrease noise caused by interference.

The symbol detector 265 detects the data symbols by demodulating the symbols other than the reference symbols.

The symbol processor 270 may include, for example, a decoder 271 which decodes the demodulated symbols of the CCs, and a media access control (MAC) interface 273 which converts decoded data into data for MAC interfacing.

As described above, according to an exemplary embodiment of the inventive concept, a plurality of CCs of different reception timings (e.g., a plurality of asynchronous CCs) may be processed to be synchronized with one another by controlling timing therebetween, thereby efficiently using hardware resources. For example, according to exemplary embodiments, the plurality of asynchronous CCs are processed to be synchronized with one another, and thus, elements (e.g., hardware resources) may be efficiently shared. Also, according to exemplary embodiments, the complexity of controlling the hardware resources by software may be decreased by processing the plurality of asynchronous CCs to be synchronized with one another. Thus, the occurrence of unexpected system malfunctions due to the complexity of controlling the hardware resources may decrease according to exemplary embodiments of the inventive concept.

Figure 8:
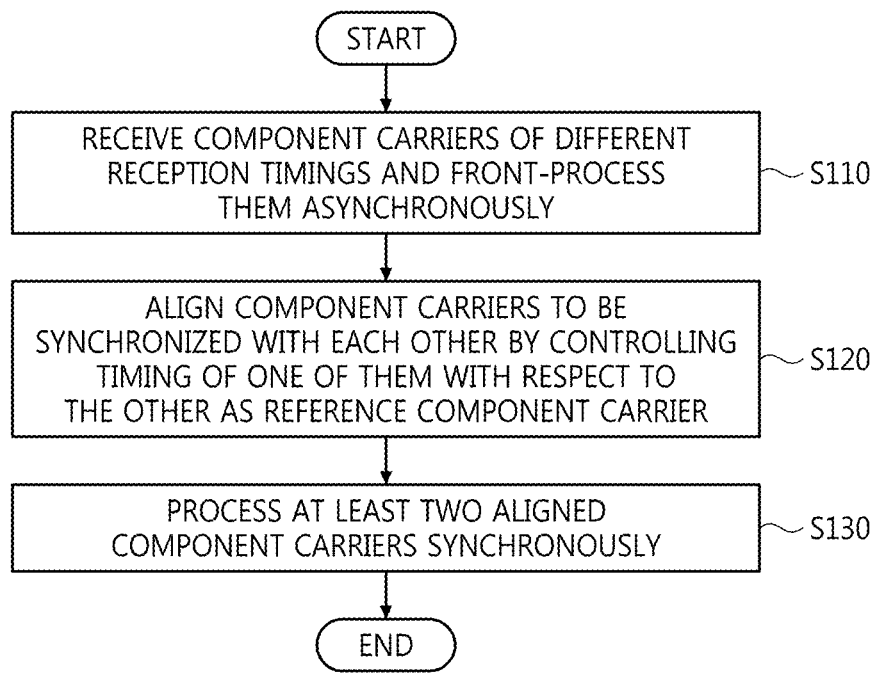
FIG. 8 is a schematic flowchart of a method of processing signals of asynchronous component carriers (CCs), according to an exemplary embodiment of the inventive concept.
Figure 9:
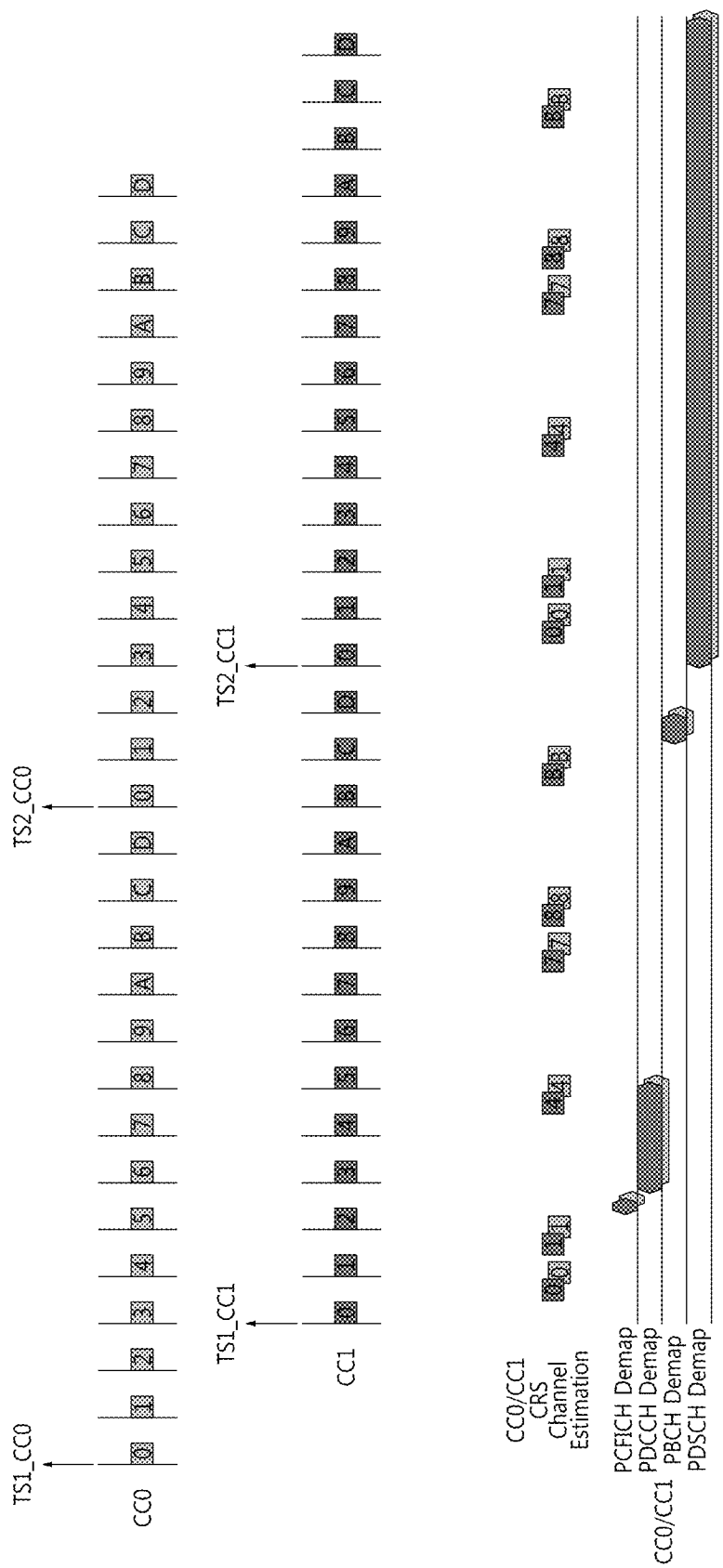
FIG. 9 is a diagram illustrating a method of processing signals of asynchronous CCs, according to an exemplary embodiment of the inventive concept.

FIG. 8 is a schematic flowchart of a method of processing signals of asynchronous CCs, according to an exemplary embodiment of the inventive concept. FIG. 9 is a diagram illustrating a method of processing signals of asynchronous CCs, according to an exemplary embodiment of the inventive concept.

The methods of FIGS. 8 and 9 may be performed by the communication module 200a of FIG. 6. Referring to FIGS. 6, 8, and 9, the communication module 200a may receive the first CC CC0 and the second CC CC1 of different reception timings, and may front-process the first CC CC0 and the second CC CC1 asynchronously (operation S110).

For example, the communication module 200a may receive and front-process the first CC CC0, which is an earliest CC, in real time (operation S110).

The communication module 200a may also receive and front-process the second CC CC1, which is later than the first CC CC0 in reception timing (e.g., the second CC CC1 is later by one symbol or more than the first CC) (operation S110). That is, the communication module 200a may front-process the first CC CC0 and the second CC CC1 asynchronously without artificially controlling the timings of the first CC CC0 and the second CC CC1 (operation S110).

In the exemplary embodiment of FIG. 9, it is assumed that a timing difference between the first CC CC0 and the second CC CC1 is about three symbols.

Thus, in the current example, a timing difference between FFT symbols of the first CC CC0 and the second CC CC1 output from the FFT unit 215 of the asynchronous processing module 210a may be three symbols. For example, the FFT unit 215 may output first to third FFT symbols 0 to 2 of the first CC CC0 and then output a first FFT symbol 0 of the second CC CC1. Next, the FFT unit 215 may alternately output the symbols of the first CC CC0 and the symbols of the second CC CC1 in an order of a symbol 3 of the first CC CC0, a symbol 1 of the second CC CC1, a symbol 4 of the first CC CC0, and a symbol 2 of the second CC CC1.

The alignment controller 220a may set, as a reference CC, the second CC CC1, which is later than the first CC CC0 in reception timing, and store the symbols of the first CC CC0, which is earlier than the reference CC, in the alignment buffer memory 270.

The alignment controller 220a may read the symbols of the first CC CC0 stored in the alignment buffer memory 270 according to the second CC CC1, which is the reference CC (operation S120).

For example, the alignment controller 220a may read the first symbol 0 of the first CC CC0 according to the first symbol 0 of the second CC CC1, and read the second symbol 1 of the first CC CC0 according to the second symbol 1 of the second CC CC1. Thus, although a timing difference between the first CC CC0 and the second CC CC1 input to the alignment controller 220a is about three symbols, a timing difference between the first CC CC0 and the second CC CC1 output from the alignment controller 220a is controlled to be one symbol or less (operation S120).

In the exemplary embodiment of FIG. 6, the elements 261, 262, and 270 of the synchronous processing module 250a may time-divisionally process symbols of each CC.

Thus, the alignment controller 220a may alternately provide the symbols of the first CC CC0 and the symbols of the second CC CC1 to the synchronous processing module 250a.

The synchronous processing module 250a may sequentially process the symbols of the first CC CC0 and the symbols of the second CC CC1, which are alternately received from the alignment controller 220a (operation S130).

The channel estimator 261 of the synchronous processing module 250a may operate time-divisionally to estimate a channel of the second CC CC1 using the reference symbols 0, 1, 4, 7, 8, and B among the symbols of the second CC CC1, and a channel of the first CC CC0 using the reference symbols 0, 1, 4, 7, 8, and B among the symbols of the first CC CC0. Thus, as illustrated in FIG. 9, the reference symbol 0 of the first CC CC0 may be processed after the reference symbol 0 of the second CC CC1, and then the reference symbol 1 of the first CC CC0 may be processed after the reference symbol 1 of the second CC CC1.

Similarly, the demodulator 262 and the symbol processor 270 may operate time-divisionally. For example, the demodulator 262 may demodulate the other symbols of the second CC CC1 using a result of estimating the channel of the second CC CC1, and may demodulate the other symbols of the first CC CC0 using a result of estimating the channel of the first CC CC0.

To demodulate the other symbols, the demodulator 262 may perform de-mapping on, for example, a PCFICH, a PDCCH, a PBCH, and a PDSCH.

Thus, as illustrated in FIG. 9, a PCFICH of the first CC CC0 may be de-mapped after a PCFICH of the second CC CC1, and then a PDCCH of the first CC CC0 may be de-mapped after the PCFICH of the second CC CC1.

Figure 10:
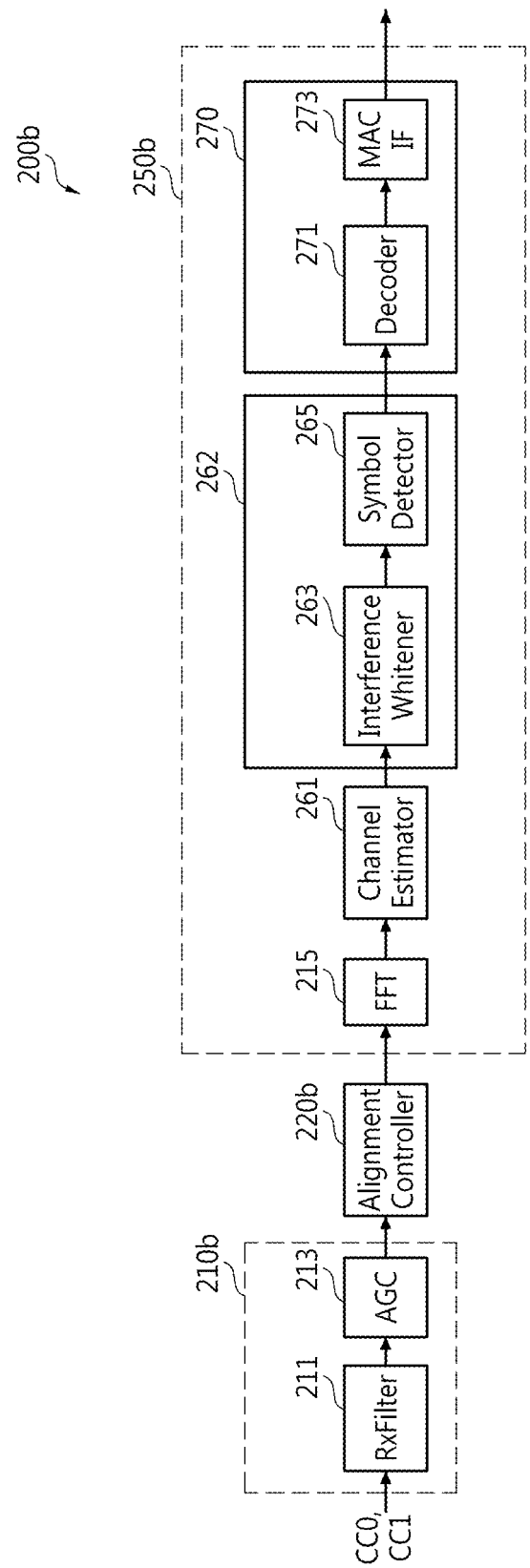
FIG. 10 is a block diagram of a communication module of FIG. 6 according to an exemplary embodiment of the inventive concept.

FIG. 10 is a block diagram of an exemplary communication module 200b according to an exemplary embodiment of the inventive concept. The communication module 200b of FIG. 10 is a modified example of the communication module 200a of FIG. 6.

The communication module 200b of FIG. 10 is substantially the same as the communication module 200a of FIG. 6 in structure and operations. Thus, for convenience of explanation, the following description of FIG. 10 focuses on the differences of the communication module 200b from the communication module 200a, and a further description of structure and operations previously described may be omitted.

In the communication module 200a of FIG. 6, the alignment controller 220a receives FFT symbols, which are converted into symbols of a frequency domain by the FFT unit 215, and controls timing thereof. In contrast, in the communication module 200b of FIG. 10, timing between two or more CCs is controlled by an alignment controller 220b, and FFT is performed on the two or more CCs by an FFT unit 215, which is included in a synchronous processing module 250b rather than in an asynchronous processing module 210b.

Thus, as described above, according to exemplary embodiments of the inventive concept, the location of the alignment controller may be varied.

Figure 11:
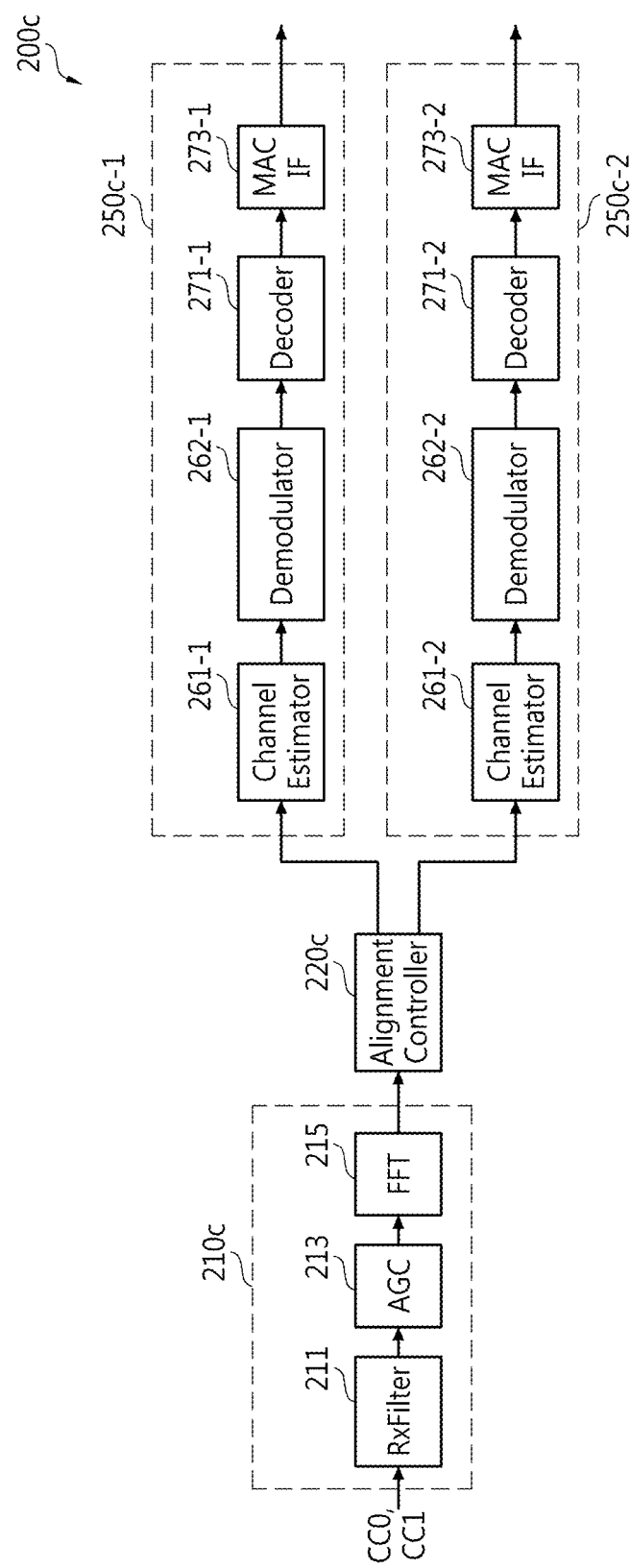
FIG. 11 is a block diagram of a communication module of FIG. 6 according to an exemplary embodiment of the inventive concept.

FIG. 11 is a block diagram of an exemplary communication module 200c according to an exemplary embodiment of the inventive concept. The communication module 200c of FIG. 11 is a modified example of the communication module 200a of FIG. 6.

The communication module 200c of FIG. 11 is substantially the same as the communication module 200a of FIG. 6 in structure and operations. Thus, for convenience of explanation, the following description of FIG. 11 focuses on the differences of the communication module 200c from the communication module 200a, and a further description of structure and operations previously described may be omitted.

In the communication module 200a of FIG. 6, the elements 261, 262, and 270 of the synchronous processing module 250a alternately receive and process (time-divisionally process) symbols of two or more aligned CCs.

In contrast, in the communication module 200c of FIG. 11, a synchronous processing module 250c, represented by 250c-1 and 250c-2, receives and processes symbols of two or more aligned CCs in parallel. To this end, the synchronous processing module 250c may include first and second channel estimators 261-1 and 261-2, first and second demodulators 262-1 and 262-2, first and second decoders 271-1 and 271-2, and first and second MAC interfaces 273-1 and 273-2.

The first channel estimator 261-1 may estimate a channel of a first CC CC0 using reference symbols among symbols of the first CC CC0. The second channel estimator 261-2 may estimate a channel of a second CC CC1 using reference symbols among symbols of the second CC CC1 while operating in parallel with the first channel estimator 261-1.

The first demodulator 262-1 may demodulate the other symbols of the first CC CC0 (e.g., symbols of the first CC CC0 other than the reference symbols of the first CC CC0) using a result of estimating the channel of the first CC CC0 by the first channel estimator 261-1. The second demodulator 262-2 may demodulate the other symbols of the second CC CC1 symbols of the second CC CC1 other than the reference symbols of the second CC CC1) using a result of estimating the channel of the second CC CC1 by the second channel estimator 261-2 while operating in parallel with the first demodulator 262-1.

Similarly, the first decoder 271-1 and the second decoder 271-2 may decode symbols of corresponding CCs in parallel.

According to an exemplary embodiment, some elements in the synchronization processing module 250c may operate in a time-divisional manner and others may operate in parallel.

Figure 12:
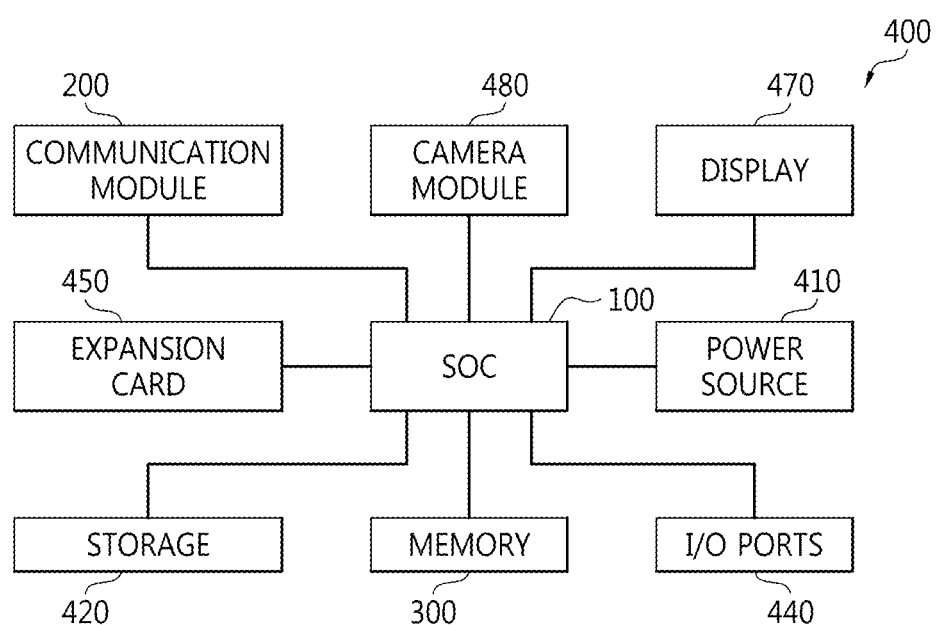
FIG. 12 is a block diagram of an electronic system according to an exemplary embodiment of the inventive concept.

FIG. 12 is a block diagram of an electronic system 400 according to an exemplary embodiment of the inventive concept.

Referring to FIG. 12, the electronic system 400 may be embodied as a portable device. The portable device may be, for example, a user equipment (UE), a mobile phone, a smartphone, a tablet PC, a personal digital assistant (PDA), a personal navigation device or a portable navigation device (PDN), an Internet of things (IoT) device, etc.

The electronic system 400 includes a system-on-chip (SoC) 100, a communication module 200, a power source 410, a storage device 420, a memory 300, input/output (I/O) ports 440, an expansion card 450, and a display 470. In an exemplary embodiment, the electronic system 400 may further include a camera module 480.

The SoC 100 may control an operation of at least one of the elements coupled thereto. The SoC 100 may correspond to the processor 100 illustrated in FIG. 4, and the communication module 200 may correspond to the communication module 200, 200a, 200b, or 200c illustrated in FIGS. 4, 5, 6, 10 and 11.

The power source 410 may supply an operating voltage to at least one among the elements 200, 300 and 420 to 480.

The storage device 420 may be embodied as, for example, a hard disk drive or a solid state drive (SSD).

The memory 300 may be embodied as, for example, a volatile memory or a nonvolatile memory.

The I/O ports 440 are configured to transmit data to the electronic system 400 or transmit data output from the electronic system 400 to an external device. For example, the I/O ports 440 may include a port configured to connect a pointing device such as a computer mouse to the electronic device 400, a port configured to connect a printer to the electronic device 400, a port configured to connect a universal serial bus (USB) drive to the electronic device 400, etc.

The expansion card 450 may be embodied as, for example, a secure digital (SD) card or a multimedia card (MMC). In an exemplary embodiment, the expansion card 450 may be a subscriber identification module (SIM) card or a universal subscriber identity module (USIM) card.

The display 470 may display data output from the storage device 420, the memory 300, the I/O ports 440, the expansion card 450, or the communication module 200.

The camera module 480 is configured to convert an optical image into an electrical image. The electrical image output from the camera module 480 may be stored in the storage device 420, the memory 300, or the expansion card 450. Also, the electrical image output from the camera module 480 may be displayed on the display 470.

Figure 13:
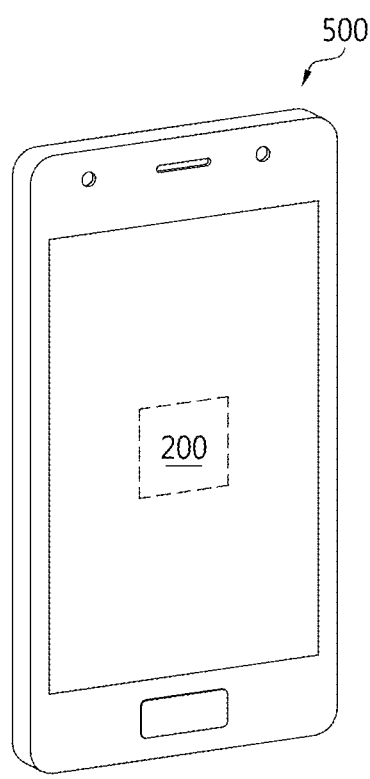
FIG. 13 is a schematic diagram illustrating a user equipment according to an exemplary embodiment of the inventive concept.

FIG. 13 is a schematic diagram illustrating a user equipment (UE) 500 according to an exemplary embodiment of the inventive concept. Referring to FIG. 13, the mobile device 500 may include the communication module 200 of FIG. 5.

The user equipment 500 may be embodied as, but is not limited to, a smartphone, a tablet PC, a personal digital assistant (FDA), an enterprise digital assistant (EDA), an Internet of things (IoT) device, a mobile internet device (MID), etc.

According to an exemplary embodiment, some elements of the synchronous processing module 250c may operate time-divisionally, and some elements thereof may operate in parallel.

According to an exemplary embodiment of the inventive concept, a plurality of CCs of different reception timings (e.g., a plurality of asynchronous CCs) are processed to be synchronized with one another by controlling timing therebetween, thereby efficiently using elements (e.g., hardware resources). For example, a plurality of asynchronous CCs may be processed to be synchronized with one another, and thus, elements (e.g., hardware resources) may be efficiently shared.

Further, according to an exemplary embodiment of the inventive concept, a plurality of asynchronous CCs may be processed to be synchronized with one another, thereby decreasing the complexity of controlling hardware resources by software. Thus, the occurrence of unexpected system malfunctions due to the complexity of controlling the hardware resources may decrease.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A signal processing apparatus for processing a plurality of component carriers (CCs), the signal processing apparatus comprising:
a front-processing circuit configured to receive a first CC and a second CC, and front-process the second CC asynchronously with the first CC, wherein the second CC is later than the first CC in reception timing;
an alignment buffer memory configured to store front-processed symbols of the first CC; and
an alignment controller configured to set the second CC as a reference CC, and output the front-processed symbols of the first CC from the alignment buffer memory such that the front-processed symbols of the first CC and front-processed symbols of the second CC are aligned with respect to the second CC,
wherein the plurality of CCs includes at least the first and second CCs,
wherein the alignment controller comprises:
a write manager configured to store symbols of the first CC and symbols of the second CC separately in the alignment buffer memory; and
a read manager configured to read the symbols of the first CC from the alignment buffer memory in an order of the symbols of the second CC.

2. The signal processing apparatus of claim 1, wherein the alignment controller further comprises:
a symbol manager configured to store and manage a bitmap indicating whether each of the symbols of the first CC stored in the alignment buffer memory have been read.

3. The signal processing apparatus of claim 1,
wherein the front-processing circuit receives and front-processes a third CC and a fourth CC included in the plurality of CCs, wherein the third and fourth CCs have a same reception timing,
wherein the alignment controller further comprises:
a bypass controller configured to bypass front-processed symbols of the third and fourth CCs, wherein the bypassed front-processed symbols of the third and fourth CCs are not stored in the alignment buffer memory.

4. The signal processing apparatus of claim 1, wherein the alignment controller further comprises:
a register configured to store control parameters for operating the alignment controller, wherein the control parameters are set by a processor, and the control parameters comprise a mode parameter indicating an asynchronous mode or a synchronous mode.

5. The signal processing apparatus of claim 1, wherein the alignment buffer memory comprises a first-in-first-out (FIFO) buffer or a circular buffer.

6. The signal processing apparatus of claim 1,
wherein a reception timing difference between the first CC and the second CC is greater than one symbol,
wherein the alignment controller is configured to control a timing difference between the front-processed symbols of the first CC and the front-processed symbols of the second CC to be one symbol or less with respect to the second CC.

7. The signal processing apparatus of claim 1,
wherein the front-processing circuit performs Fast Fourier Transform (FFT) on the first CC and the second CC,
wherein symbols stored in the alignment buffer memory comprise symbols on which FFT is performed by the front-processing circuit.

8. The signal processing apparatus of claim 1, further comprising:

a synchronous processing circuit configured to receive and process the front-processed symbols of the first and second CCs aligned by the alignment controller.

9. The signal processing apparatus of claim 8, wherein the synchronous processing circuit comprises:
- a channel estimator configured to estimate a channel of the first CC using reference symbols from among the front-processed symbols, of the first CC, and estimate a channel of the second CC using reference symbols from among the front-processed symbols of the second CC;
- a demodulator configured to demodulate the front-processed symbols of the first CC other than the reference symbols of the first CC using a result of estimating the channel of the first CC, and demodulate the front-processed symbols of the second CC other than the reference symbols of the second CC using a result of estimating the channel of the second CC; and
- a decoder configured to decode the demodulated front-processed symbols of the first CC and the demodulated front-processed symbols of the second. CC,
- wherein the channel estimator, the demodulator, and the decoder are configured to operate time-divisionally.

10. The signal processing apparatus of claim 8, wherein the synchronous processing circuit comprises:
- a first channel estimator configured to estimate a channel of the first CC using reference symbols from among the front-processed symbols of the first CC;
- a second channel estimator configured to operate in parallel with the first channel estimator, and estimate a channel of the second. CC using reference symbols from among the front-processed symbols of the second CC;
- a first demodulator configured to demodulate the front-processed symbols of the first CC other than the reference symbols of the first CC using a result of estimating the channel of the first CC;
- a second demodulator configured to operate in parallel with the first demodulator, and demodulate the front-processed symbols of the second CC other than the reference symbols of the second CC using a result of estimating the channel of the second CC;
- a first decoder configured to decode the demodulated front-processed symbols of the first CC; and
- a second decoder configured to operate in parallel with the first decoder, and decode the demodulated front-processed symbols of the second CC.

11. A user equipment, comprising:
- a signal processing device configured to generate decoded data by processing a plurality of component carriers (CCs), wherein the plurality of CCs includes at least a first CC and a second CC; and
- an application processor configured to process the decoded data and provide a user with the processed data,
- wherein the signal processing device comprises:
- a front-processing circuit configured to receive the first CC and the second CC, and front-process the first and second CCs asynchronously, wherein the first and second CCs have different reception timings;
- an alignment controller configured to control a timing between the first and second CCs using an alignment buffer memory; and
- a synchronous processing circuit configured to process the timing-controlled first and second CCs synchronously,
- wherein the front-processing circuit performs Fast Fourier Transform (FFT) on the first CC to obtain FFT symbols of the first CC, and performs FFT on the second CC to obtain FFT symbols of the second CC,
- wherein the alignment buffer memory stores the FFT symbols of the first CC,
- wherein the alignment controller outputs the FFT symbols of the first CC from the alignment buffer memory such that the FFT symbols of the first CC and the FFT symbols of the second CC are aligned with respect to the second CC.

12. The user equipment of claim 11, wherein the alignment controller comprises:
- a write manager configured to store the FFT symbols of the first CC and the FFT symbols of the second CC separately in the alignment buffer memory; and
- a read manager configured to read the FFT symbols of the first CC from the alignment buffer memory in an order of the FFT symbols of the second CC; and
- a symbol manager configured to store and .manage a bitmap indicating whether each of the symbols of the first CC stored in the alignment buffer memory has been read.

13. A signal processing apparatus for processing a plurality of component carriers (CCs), the signal processing apparatus comprising:
- a front-processing circuit configured to receive a first CC and a second CC, wherein each of the first. CC and the second CC comprise a plurality of symbols, wherein the front-processing circuit is configured to output at least a first two symbols of the first CC, and subsequently alternately output remaining symbols of the first CC and the second CC, to an alignment controller, wherein the second CC is later than the first CC in reception timing;
- an alignment buffer memory configured to store the plurality of symbols of the first CC; and
- the alignment controller configured to set the second CC as a reference CC, and output the plurality of symbols of the first CC from the alignment buffer memory such that the plurality of symbols of the first CC and the plurality of symbols of the second CC are aligned with respect to the second CC,
- wherein the plurality of CCs includes at least the first and second CCs, and the second CC has a latest reception timing from among the plurality of CCs.

14. The signal processing apparatus of claim 13, further comprising:
- a synchronous processing circuit configured to receive and process the symbols of the first and second CCs aligned by the alignment controller.

15. The signal processing apparatus of claim 14, wherein the synchronous processing circuit comprises:
- a channel estimator configured to estimate a channel of the first CC using reference symbols from among the front-processed symbols of the first CC, and estimate a channel of the second CC using reference symbols from among the front-processed symbols of the second CC;
- a demodulator configured to demodulate the front-processed symbols of the first CC other than the reference symbols of the first CC using a result of estimating the channel of the first CC, and demodulate the front-processed symbols of the second CC other than the reference symbols of the second CC using a result of estimating the channel of the second CC; and
- a decoder configured to decode the demodulated front-processed symbols of the first CC and the demodulated front-processed symbols of the second CC, wherein the channel estimator, the demodulator, and the decoder are configured to operate time-divisionally.

16. The signal processing apparatus of claim 13, wherein the front-processing circuit comprises:
a Fast Fourier Transform (FFT) circuit configured to perform FFT on the first CC to obtain FFT symbols of the first CC, and FFT on the second CC to obtain FFT symbols of the second CC,
wherein the alignment buffer memory stores the FFT symbols of the first CC.

17. The signal processing apparatus of claim 16, wherein the alignment controller outputs the FFT symbols of the first CC from the alignment buffer memory such that the FFT symbols of the first CC and the FFT symbols of the second CC are aligned with respect to the second CC.

* * * * *